United States Patent [19]

Booher

[11] Patent Number: 4,671,526

[45] Date of Patent: Jun. 9, 1987

[54] ALIGNMENT COUPLING DEVICE FOR DUMP TRAILERS

[76] Inventor: Howard Booher, P.O. Box 277, Randolph, Ohio 44265

[21] Appl. No.: 825,383

[22] Filed: Feb. 3, 1986

[51] Int. Cl.$^4$ ............................................. B60P 1/02
[52] U.S. Cl. ................................. 280/433; 298/20 A; 298/22 AE
[58] Field of Search .................. 280/433, 438 R, 439, 280/440; 298/20 R, 20 A, 22 AE, 38, 22 C, 17 R, 17.5, 9, 11; 296/184; 308/3.9

[56] References Cited

U.S. PATENT DOCUMENTS

| | | | |
|---|---|---|---|
| 2,539,086 | 1/1951 | Kirksey | 298/22 AE |
| 2,542,795 | 2/1951 | Clement | 298/20 R |
| 2,661,236 | 12/1953 | Schonrock | 298/20 A |
| 2,954,995 | 10/1960 | Grise | 298/38 |
| 3,003,818 | 10/1961 | Merchant | 298/22 AE |
| 3,044,832 | 7/1962 | McManus | 298/20 A |
| 4,084,852 | 4/1978 | Prosek | 298/22 C |
| 4,415,300 | 11/1983 | Boddicker | 298/20 R |

FOREIGN PATENT DOCUMENTS 114622 9/1980 Japan ................................. 296/184

Primary Examiner—John J. Love
Assistant Examiner—Everett G. Diederiks, Jr.
Attorney, Agent, or Firm—Harpman & Harpman

[57] ABSTRACT

A coupler device for use on frameless dump trailers to guide and position the dump body on the fifth wheel plate. The coupler is comprised of a coupler saddle having an inverted generally U-shaped cavity that engages and registers with an upstanding coupler positioned on the fifth wheel plate of the trailer providing multiple axis positioning of the frameless dump body.

3 Claims, 7 Drawing Figures

4,671,526

ALIGNMENT COUPLING DEVICE FOR DUMP TRAILERS

BACKGROUND OF THE INVENTION

1. Technical Field

This invention relates to guiding and positioning of dump bodies to fifth wheel plates on frameless dump trailers after the dump body has been elevated during unloading by a hydraulic cylinder.

2. Description of the Prior Art

Prior art devices of this type have relied on a variety of different dump body guides and engagement points. See for example U.S. Pat. Nos. 1,663,537, 4,084,852, and 4,273,382.

Additionally see Hobbs catalog sheet and East Manufacturing catalog sheet.

In U.S. Pat. No. 1,663,537, a dump truck is disclosed having dump bodies guides 41, and a pair of upstanding arms and a plurality of recesses engageable on pins.

U.S. Pat. No. 4,084,852 discloses a roll over protection structure for dump trucks showing a release and positioning structure that holds and releases the trailer on contact.

In U.S. Pat. No. 4,273,382, a hold down system is disclosed wherein a matching configuration on the trailer and dump body engages and holds the same in registering relation to one another The catalog sheet of Hobbs discloses a plate assembly on the fifth wheel plate and a fixture on the dump body that engages the same.

The catalog sheet of East Manufacturing discloses a pair of oppositely disposed upstanding body guides on saddle structures positioned on the fifth wheel plate the guides and holds the dump body thereon.

SUMMARY OF THE INVENTION

A coupler device that positions and guides a dump body onto the fifth wheel plate of a frameless dump trailer has a pair of oppositely disposed coupler configurations on the fifth wheel plate and registrable inverted coupler saddles positioned on the dump body. The coupler saddle acts as a combination dump body guide and saddle support for the frameless dump trailer.

DESCRIPTION OF THE PREFERRED EMBODIMENT

Figure 1:
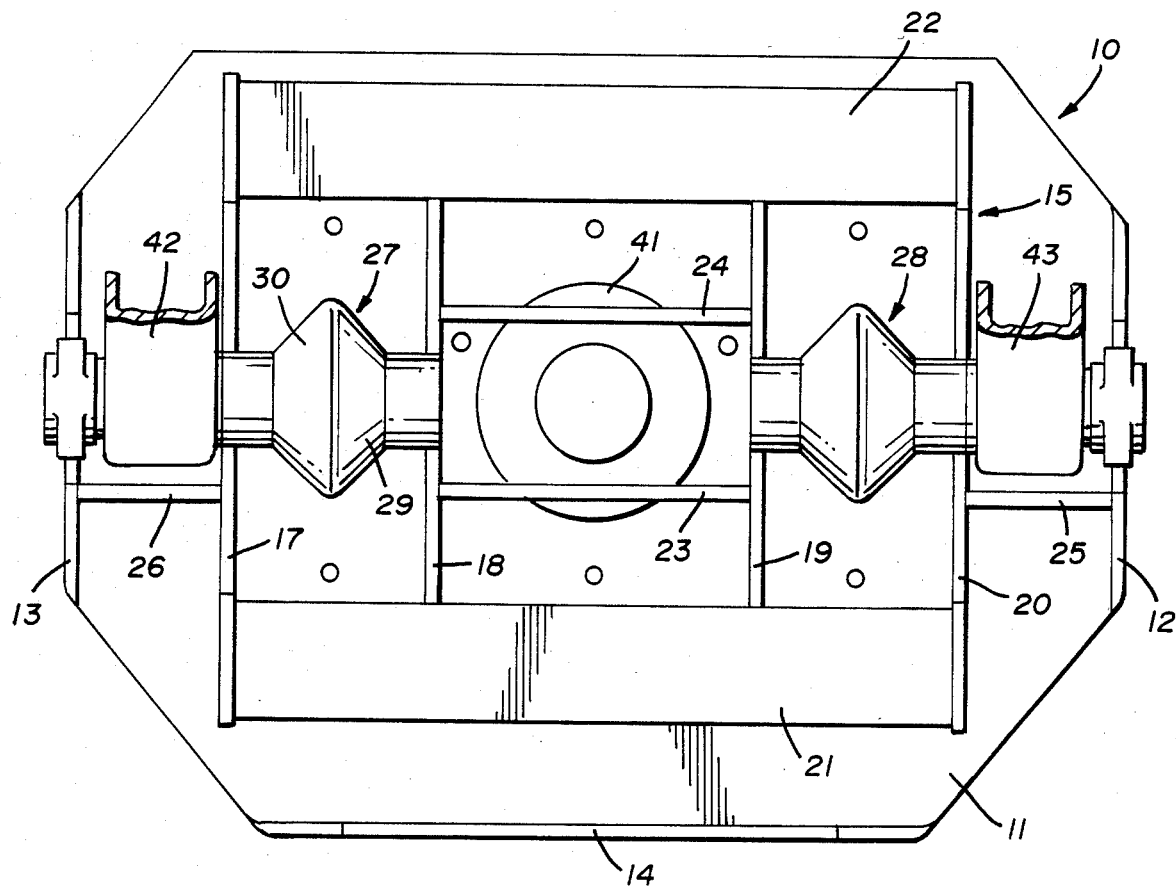
FIG. 1 is a top plan view of a fifth wheel plate of a frameless dump trailer.

A coupler device for use on frameless dump trailers having a fifth wheel plate 10 comprising a main frame member 11 having oppositely disposed upturned flanges 12 and 13 and an upturned front flange 14.

A reinforcing and support structure 15 is positioned on the main frame member 11 from which extends a fifth wheel pin 16 as will be well understood by those skilled in the art. The reinforcing and support structure 15 is comprised of a plurality of upstanding parallel reinforcing members 17, 18, 19 and 20 with cross support plates 21 and 22 secured thereto. Secondary upstanding reinforcing members 23 and 24 are secured between said reinforcing members 18 and 19 with upstanding stabilizing members 25 and 26 secured between reinforcing members 17 and 20 and upturned flanges 12 and 13 respectively.

A pair of oppositely disposed couplers 27 and 28 are secured to and positioned between said reinforcing members 17 and 18 and 19 and 20 as best see in FIG. 1 of the drawings.

Figure 2:
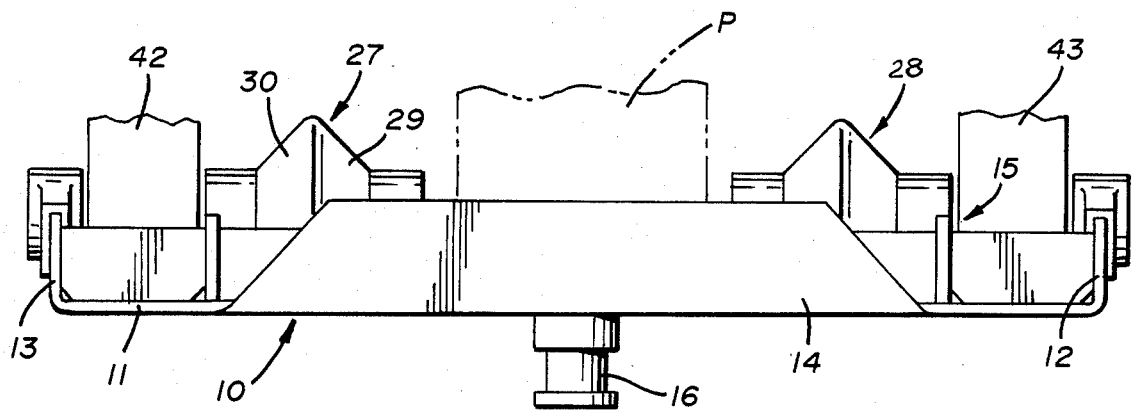
FIG. 2 is a front plan view of the fifth wheel plate of FIG. 1.
Figure 3:
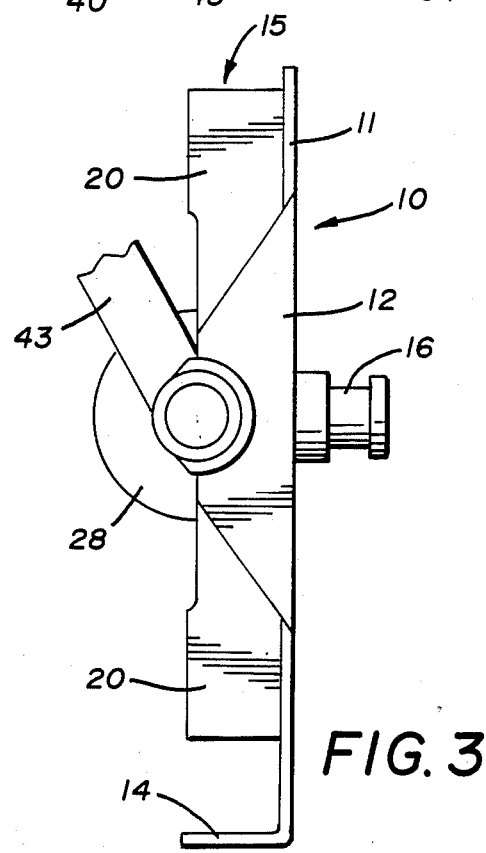
FIG. 3 is an end plan view of the fifth wheel plate of FIG. 1.

Referring now to FIGS. 1,2,3 and 7 of the drawings, each of the couplers has a compound shape generally rectangular with tapered oppositely disposed sides 29 and 30 with converging end portions 31. The tapered sides 29 and 30 are arcuate as best seen in FIG. 3 of the drawings. This compound shape presents a unique surface configuration which is registrable in a multi-axis relationship, both vertical, lateral and transverse engagement properties.

Figure 4:
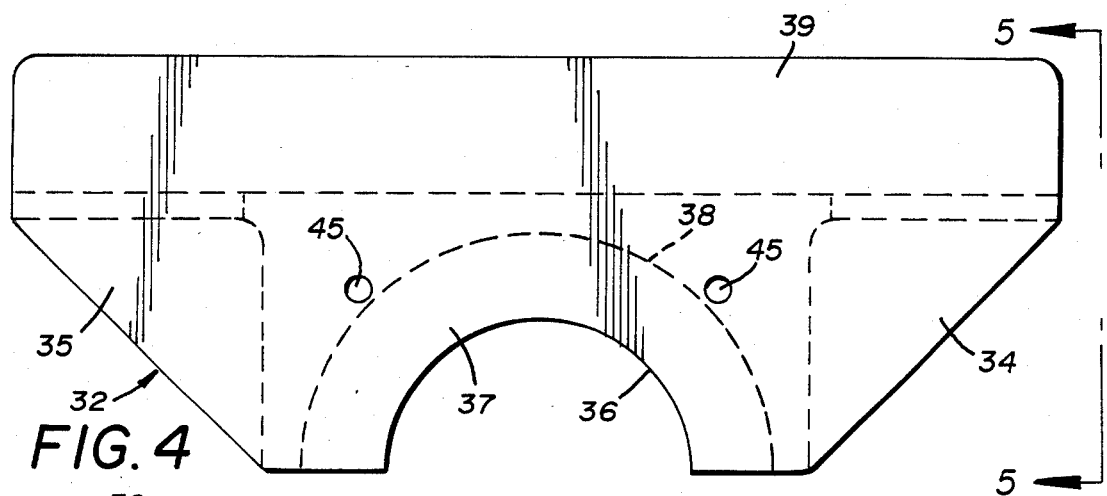
FIG. 4 is a side plan view of a coupler saddle to be positioned on the dump body.
Figure 6:
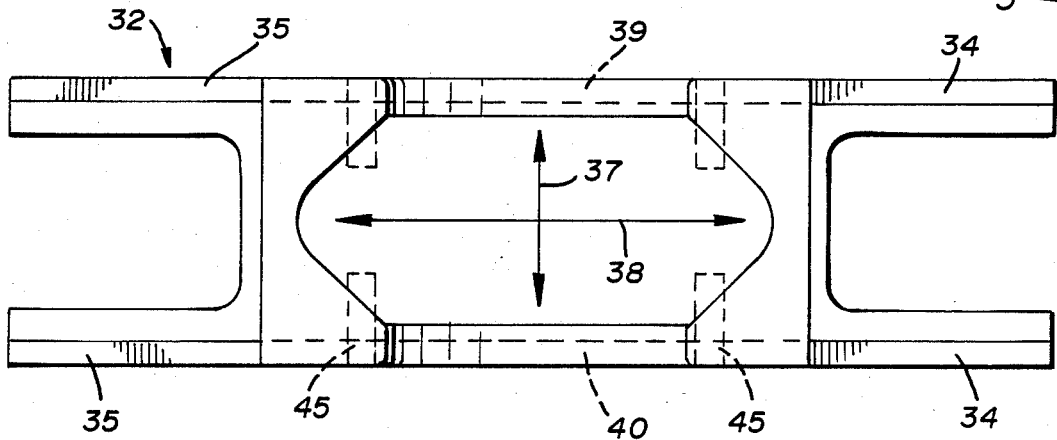
FIG. 6 is a bottom plan view of the coupler saddle of FIG. 4.
Figure 5:
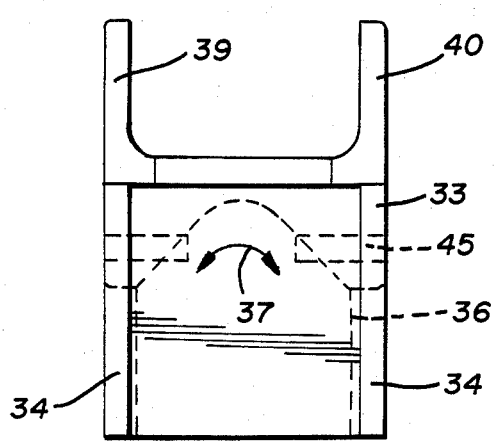
FIG. 5 is an end plan view of the coupler saddle of FIG. 4.

Referring now to FIGS. 4,5 and 6 of the drawings, a coupler saddle 32 can be seen comprising a generally cross sectional H-shaped frame member 33 with pairs of oppositely disposed outturned extending angled members 34 and 35. A compound configured concave cavity 36 is formed upwardly and inwardly between said angular members 34 and 35 and is characterized by transverse and longitudinal curved surfaces 37 and 38 respectively and indicated by the indicator arrows in FIGS. 4 and 5 of the drawings. A pair of oppositely disposed longitudinally extending attachment flanges 39 and 40 extend along the upper portion of the coupler saddle forming the upper part of the generally H-shaped frame configuration as seen in FIG. 5 of the drawings. It will be evident from FIG. 7 of the drawings that attachment flanges 39 and 40 are used to secure the coupler saddle 32 to the underside of a dump body B by welding and are positioned thereon to engage the coupler as hereinbefore described on the fifth wheel plate 10.

A representation of a hydraulic piston and cylinder assemblies P mounting position 41 is shown on the fifth wheel plate 10 between the secondary reinforcing member 23 and 24 and in broken lines in FIG. 2 of the drawings. Guide and support arms 42 and 43 are pivotally secured between the upturned flanges and reinforcing members configurations 20, 12 and 17, 13, respectively, and extend to the dump body B as will be well understood by those skilled in the art.

Figure 7:
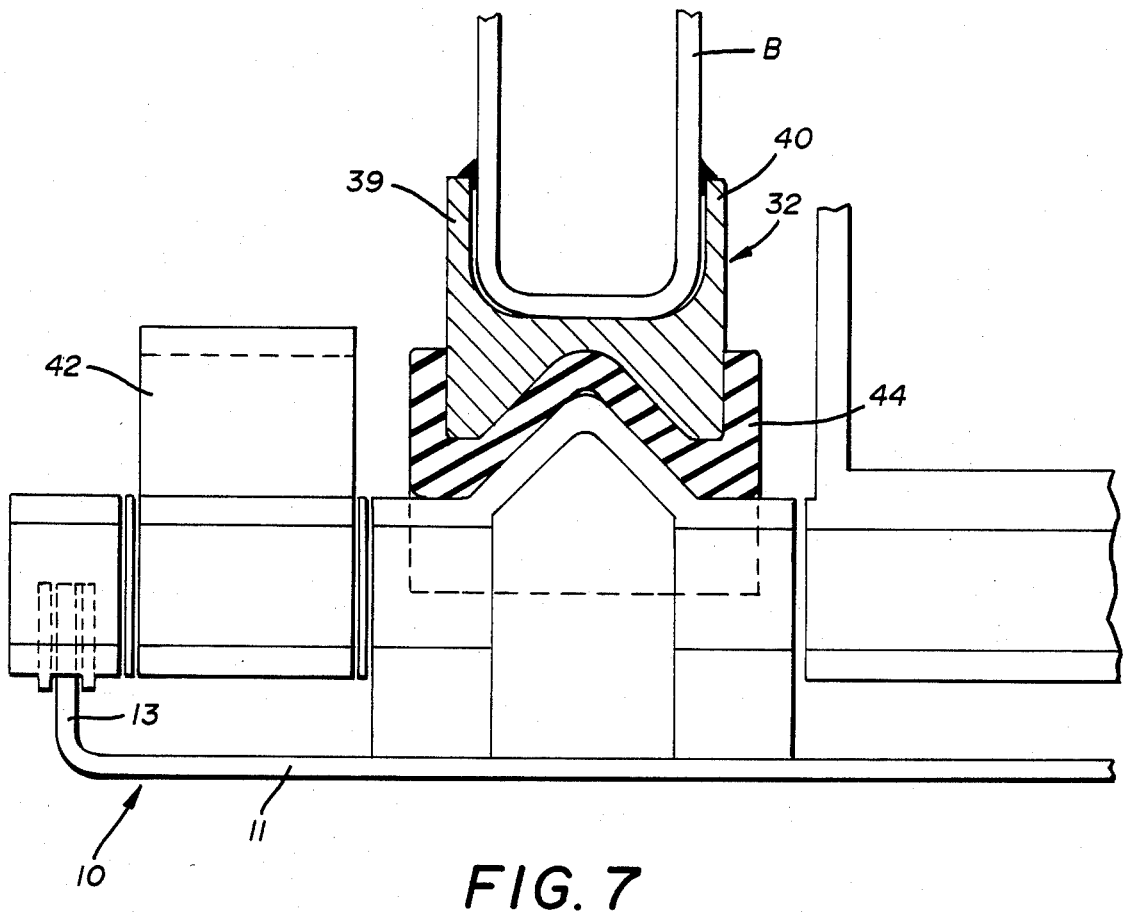
FIG. 7 is an enlarged view of a portion of the fifth wheel plate in FIG. 2 with a registering coupler on a fifth wheel and a coupler saddle on a dump body engaged thereon.

Referring now to FIG. 7 of the drawings, a rubber coupler liner 44 can be seen having a cross sectionally generally W-shaped configuration that is compound curved on both its transverse and longitudinal axis to conform with the compound shape of the coupler saddle 32 so as to extend within and around the same forming a resilient point of engagement with couplers 27 and 28. The coupler liner 44 is held in place by fasteners, not shown, extending from apertures 45 in the coupler saddles as best seen in FIGS. 5 and 6 of the drawings.

It will be evident from the above description that as the coupler saddles 32 engage the couplers 27 and 28 a multiple alignment action takes place of the dump body B on the fifth wheel plate 10 wherein transverse and longitudinal alignment on a horizontal plane and vertical alignment is simultaneously achieved by a unique configuration of the coupler and coupler saddle engagement.

Thus having described my invention, it will be apparent to those skilled in the art that various changes and modificatons may be made therein without departing from the spirit of the invention and therefore I claim:

1. A coupler assembly for guiding and positioning a dump body onto a frameless dump trailer comprising in combination:

a frameless dump trailer having a fifth wheel plate;

at least two spaced couplers secured to said fifth wheel plate, each said coupler having a compound arcuate shape with tapered oppositely disposed sides converging along a central longitudinal axis;

a dump body pivotally attached to said frameless dump trailer between raised and lowered positions;

at least two coupler saddles, each coupler saddle being secured to said dump body and registerably aligned with a corresponding one of said spaced couplers such that when said pivotal dump body is moved from a raised to a lowered position, each said at least two coupler saddles engage a respective one of said at least two spaced couplers so as to align said dump body on said frameless dump trailer; and cushioning means between said couplers and said saddles.

2. The coupler assembly of claim 1 wherein the coupler saddles have compound, concave configurations in matching registration with said couplers.

3. The coupler assembly of claim 1 wherein said means between said coupler and coupler saddles comprises a resilient coupler liner conforming and secured to said coupler saddles.

* * * * *